May 5, 1964  P. R. WALTON  3,132,096
CONTINUOUS SALINE WATER PURIFICATION
Filed Nov. 21, 1961  3 Sheets-Sheet 1

INVENTOR.
Paul R. Walton
BY 
Attorney

May 5, 1964

P. R. WALTON 3,132,096

CONTINUOUS SALINE WATER PURIFICATION

Filed Nov. 21, 1961

INVENTOR.
Paul R. Walton
BY
Charles A. Huggett
Attorney

United States Patent Office 3,132,096
Patented May 5, 1964

3,132,096
CONTINUOUS SALINE WATER PURIFICATION
Paul R. Walton, Glassboro, N.J., assignor to Socony Mobil Oil Company, Inc., a corporation of New York
Filed Nov. 21, 1961, Ser. No. 153,895
11 Claims. (Cl. 210—59)

This invention relates to the conversion of brackish or saline waters to potable water and particularly relates to a continuous process for the conversion of salt-laden water to usable salt-free water.

In most parts of the world adequate supplies of fresh water have been so readily available or easily obtained that fresh water has been taken for granted. Recent developments have hinted that the demand for fresh water in many parts of the world will not be met in a few short years unless novel methods of providing fresh water are found. It is known that brackish or saline water can be converted to fresh water by distillation, but this process is considered too expensive to provide the enormous volume of water that will be required in five to ten years, at least on an economical basis.

Comprehensive government studies of water availability and use predict a fresh water demand doubling in the next two decades to nearly 600 billion gallons per day. Water shortages resulting from the increasing demand are already being felt with probably 20% of this country's population occasionally lacking sufficient water. A source of supply of fresh water to meet the increasing demand must be obtained at a reasonable and economical cost. The Government and many private concerns are working on this problem to find satisfactory solutions, but, although some progress has been made, no completely satisfactory solution has yet been found. Some of the approaches to the problem involve construction of new dams and reservoirs, re-use of water by industrial concerns where cleanliness is not a factor, evaporation suppression, thereby reducing loss of water to the atmosphere, saline water conversion and cloud seeding. This invention relates to the saline water conversion approach.

The possibility of extracting unlimited amounts of fresh water from the sea has held the public interest for a long time. The United States Government officially recognized this potential in 1952 with the Saline Water Act and the establishment of the Office of Saline Water. By this act and through this office the Government endeavors to encourage development of usable processes for the production of cheap water. This program has already produced a variety of pilot plants or demonstration plants using the principles of vapor compression distillation, multiple effect distillation, flash distillation, electrodialysis and freezing.

Work on the freezing process has shown that water crystals exclude the brine and hence can be reclaimed as pure water if the brine can be separated from the crystals. Efforts to wash the water crystals create a delicate temperature problem since, if the wash water temperature is too high, the ice crystals melt and recombine with the salt or, if the wash water temperature is too low, the wash water freezes. Work with certain hydrocarbons has shown that when combined with brine under suitable temperature and pressure, crystals are formed which appear to be a hydrocarbon crystal nucleus surrounded by water crystals. This crystal is called a clathrate crystal. Clathrates are members of the general class known as inclusion compounds. With clathrates the entrapped molecule is completely surrounded by the lattice structure. Two basic crystal structures can form, i.e., those with about 8 or 17 molecules of water per molecule of hydrating agent. The decomposition temperature is above the freezing point of water and the hydrates, therefore, can be washed with water without danger of melting. By selecting a clathrate forming material from the group consisting of methyl bromide, Freon 31, Freon 21, and propane, the clathrate crystal melting point is maintained between about 40–55° F. It is seen that this temperature range is substantially higher than the freezing point of water. By selecting a water washing temperature below the melting point of the clathrate crystals and above the freezing point of water, the clathrate crystals can be freed of brine without the difficulty previously encountered.

A great volume of clathrate crystals must be formed, washed to remove brine and melted to separate out usable volumes of water. In order to complete on a practical basis, the water cost per pound must be low, i.e., less than $1.00 per thousand gallons.

I have found that bulk quantities of fresh water can be obtained by mixing brackish or salt water continuously with a clathrate former selected from the group consisting of methyl bromide, Freon 31, Freon 21 and propane. The mixture is then cooled to form clathrate crystals and the crystals are allowed to rise in touching, expanded-bed form through a descending stream of water maintained at a temperature of at least about 1–5° F. higher than water freezing temperature. The washed crystals are transferred continuously to a heating zone to release the clathrate former as a gas and the fresh potable water is removed continuously therefrom.

The object of this invention is to provide a process and apparatus for converting saline water to fresh potable water.

A further object of this invention is to provide a process and apparatus for continuously converting saline water to fresh potable water.

A further object of this invention is to provide a process and apparatus for continuously converting saline water to fresh water at a price level below about one dollar per thousand gallons of fresh water.

Figure 1:
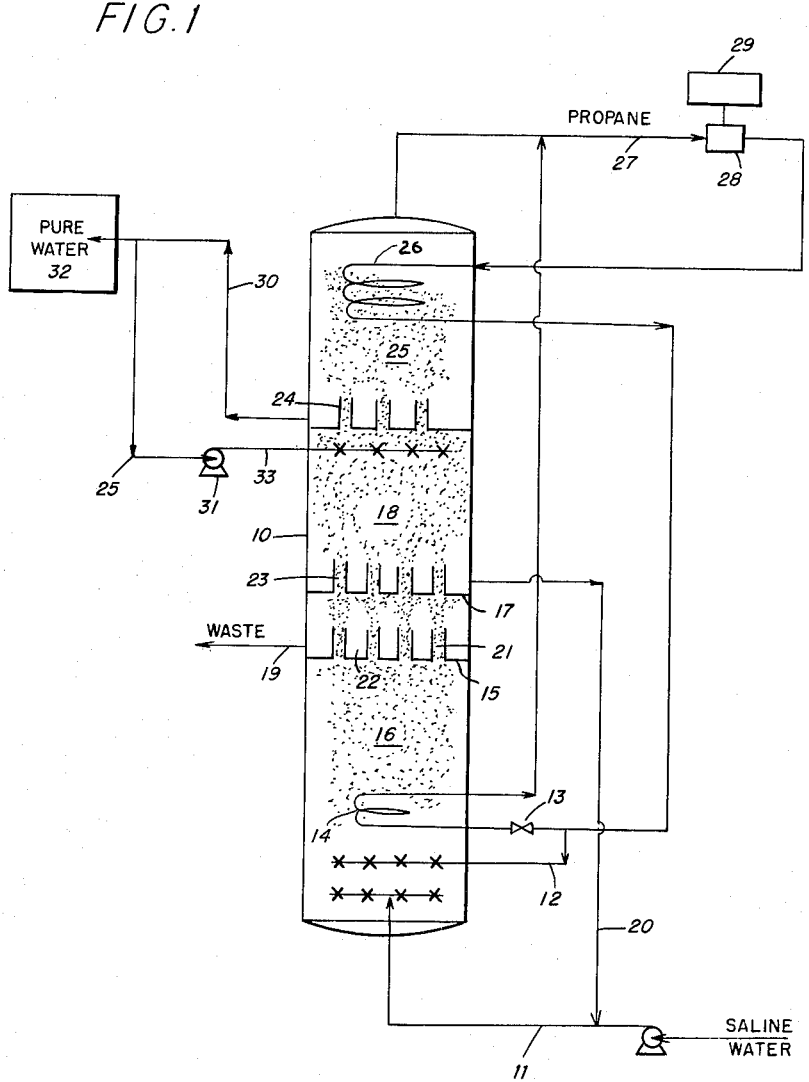
FIGURE 1 shows, in highly diagrammatic form, a saline water purification system suitable for operation in accordance with this invention.
Figure 1:

Referring now to FIGURE 1, a vertical tower 10 is shown. Brine is admitted to the bottom of the tower 10 through the conduit 11. The pressure in the tower is maintained at about 10–100 p.s.i. (gauge) and a suitable clathrate former, such as liquid propane, is admitted to the bottom of the tower 10 through the conduit 12. A portion of the liquid propane is released by valve 13 to form a gas which is then passed through coil 14 in the base of the tower 10 to extract heat from the mixture of brine and propane. The cooled mixture of brine and propane forms clathrate crystals. These crystals have a nucleus of propane surrounded by water crystals and have a size of about .05″–0.4″ diameter. The crystals are less dense than the liquid and rise continuously in the liquid. Operating conditions are selected to provide a substantially compact rising bed of crystals.

A first partition plate 15 provided with a plurality of open ended riser tubes 21 is located across the tower 10 and a second partition plate 17 provided with a plurality of open ended riser tubes 23 is located across the tower 10 a spaced distance from one another to form a spent or concentrated brine separation chamber intermediate chambers 16 and 18 shown on the drawing. Waste brine moving upwardly through riser tubes 21 with previously formed crystals is separated from the crystals in the intermediate chamber 22 and removed from between the first and second partition plates forming the intermediate chamber through conduit 19. The riser tubes 21 located in the first partition plate 15, direct and control the flow of the clathrate crystals with the brine into the separation chamber 22. The risers 21 projecting above plate 15, therefore, provide settling space for the brine and substantially free of crystals so that removal of the brine through conduit 19 free of entrained clathrate crystals may be substantially accomplished. Similarly, the open end risers 23 located in and extending above the second partition plate 17 provide for settling space in the lower portion of chamber 18 above partition 17 so that wash water and/or dilute brine may be removed as a recycle brine stream 20 free of clathrate crystals.

In the washing chamber 18 the upward flow of clathrate crystals is restricted as a relatively dense mass of crystals by a third baffle provided with a plurality of riser tubes 24 so that the mass of particles moves generally upwardly in substantially compact form from chamber 18 through riser tubes 24 of the chamber 25. The particles in the mass of particles are in substantially touching contact with one another and their removal from the top of chamber 18 is directed and controlled by their passage through riser tubes 24 into chamber 25 and at a slow enough continuous flow rate to maintain the particles in the washing chamber 18 for a time to effect the successful operation of the washing step. A clean wash water is introduced continuously into the upper portion of the washing chamber 18 by conduit 33 to travel downwardly through the rising clathrate crystals. The temperature of the water is controlled below the melting point of the clathrate crystals but above the freezing point of water. For example, if the melting point of the clathrate crystals is 40° F. and the freezing point of the water 30° F., the wash water can be maintained at about 34–36° F. without difficulty and without creating problems in the washing of occluded and surface brine from the crystals. The flow rate of the wash water downwardly through the washing chamber is adjusted to retard the countercurrent upward flow of clathrate crystals so that the bed of crystals is expanded to some extent over what would occur under packed conditions. The particles maintain touching contact and are still maintained in substantially compact form but have a limited amount of additional freedom as compared to a tightly packed bed. The flow rate of the washing liquid must be adjusted to retard the upward flow of the crystals sufficiently to form an expanded bed in which the particles are in generally touching contact and move in a generally upward direction and in which the expanded bed occupies a space not more than about 25 percent greater than it would in compact condition. If the flow of water is so great that the bed is disrupted, the washing step is not properly performed and there is danger of damage to the crystals and of resulting upsets in the system. It is essential, therefore, that an expanded bed be maintained. The expanded bed provides for maximum flow of wash water through the bed with minimum particle movement. Because the particles are touching, their range of movement is restricted and yet the washing is exceedingly effective. The restricted movement prevents damage to the crystals that would occur with unhindered movement. The effective washing is caused in part by the fact that the water moves by the particles at higher velocity than if the bed were disrupted, thereby providing an unusually good scrubbing action.

The washed clathrate crystals are heated in the separating chamber 25 by the coil 26. The water crystals convert to liquid water and the propane crystals convert to propane gas. The gas is withdrawn through the conduit 27 and put under pressure by means of the pump 28. The pump 28 is driven by the motor 29. The hot gas under pressure is cooled in coil 26 and converts to liquid propane. The liquid propane is passed through conduit 12 into the crystal forming chamber 16. Pure water is taken from the bottom of the separating chamber 25 through the conduit 30. Pump 31 is used to return a portion of this water as the wash water used in the washing chamber 18. The remainder of the water is charged to the storage chamber 32 from which it is drawn as desired.

EXAMPLE 1

Using apparatus similar to that shown in FIGURE 1 with the vessel diameter being about 13 feet, about 2,300,000 gallons per day of brine (concentration 3.4% by weight sodium chloride) is fed into the bottom of the vessel 16. About 59,000 pounds per hour of liquid propane is also charged to the bottom of the tower 16. The clathrate forming chamber is maintained at about 60 p.s.i.a. and about 35° F. in this design, these conditions being necessary for the formation of the desired crystals. The crystals are washed with fresh water and the wash water is removed with a salt content of about 6% by weight sodium chloride. The wash water flow rate is controlled at about 1,500,000 gallons per day. The waste brine removed from the brine removal chamber 22 by conduit 19 is about 1,300,000 gallons per day. About 1,500,000 gallons per day of brine is recycled from the bottom of the washing chamber by conduit 20 to the bottom of the tower 10. Some of the wash water flows upwardly with the crystals and is recycled from the separation chamber 25 to the washing chamber 18. About 1,000,000 gallons per day of pure water is removed by conduit 30 to the storage chamber 32. About 311,000 pounds per hour of propane is passed through the valve 13, the coil 14 and back to the intake side of the pump 28. The temperature in the separating chamber is maintained at 45° F. which is adequate to melt the clathrate crystals into propane gas and liquid water. A 1500 brake horsepower compressor 29 is required to pump the propane gas up to about 60 p.s.i. (gauge). The investment cost of this unit is about $700,000 and the operating cost, exclusive of investment, is about 50 cents per 1000 gallons of fresh water.

Figure 2:
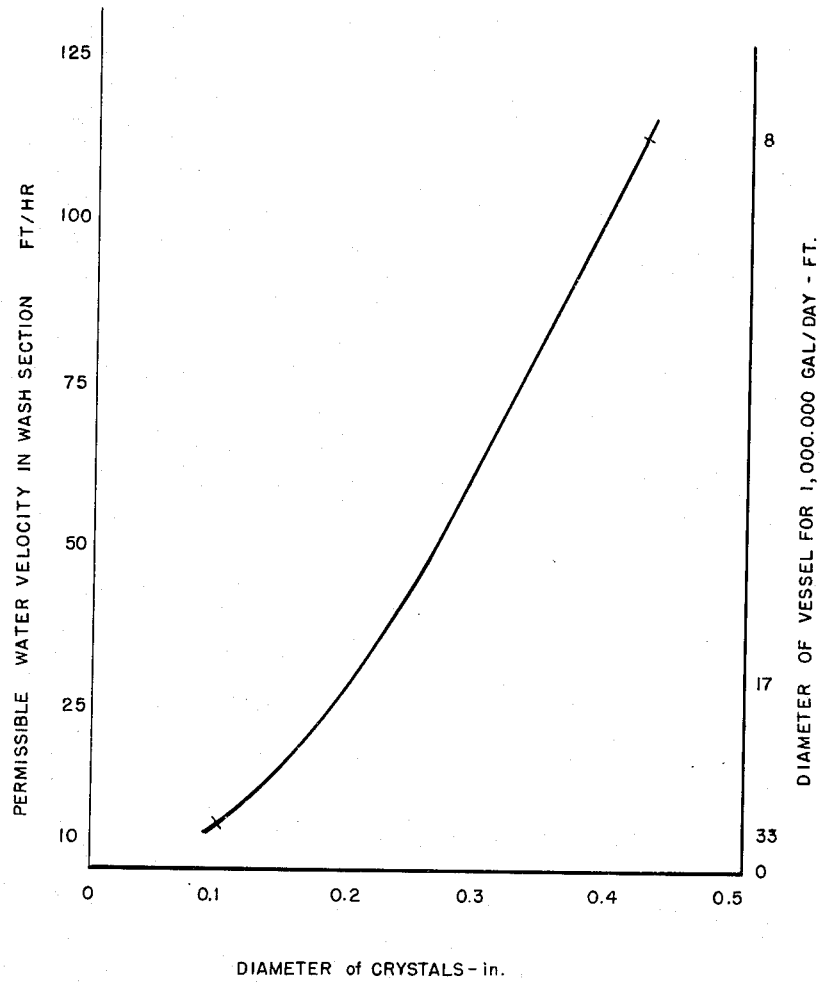
FIGURE 2 shows a plot of water velocity in the washing chamber vs. crystal diameter.

Referring now to FIGURE 2, a plot is shown of permissible water velocity in the washing chamber vs. diameter of clathrate crystals to maintain the crystal bed in the expanded range required for this invention. This curve shows the allowable superficial velocity in the washing chamber as a function of hydrate crystal diameter. The right vertical axis of FIGURE 2 shows the corresponding vessel size when producing 1,000,000 gallons per day of fresh water.

The Example 1 given hereinabove illustrates the use of propane as a hydrate forming agent. Many other hydrates are known such as methane, ethane, nitrogen oxide, acetylene, carbon dioxide, methyl fluoride and hydrogen sulfide. Usable hydrate forming agents particularly adapted to this process are largely limited to propane, methyl bromide, Freon 31 and Freon 21. The following Table I presents the pertinent operating factors with each hydrate forming material.

*Table I*

| Material | Operating Temperature, ° F. | Conditions Pressure, p.s.i.a. | Wt. Percent Material in Hydrate |
|---|---|---|---|
| Propane | 35 | 75 | 13 |
| Methyl Bromide | 48 | 19 | 40 |
| Freon 31 CH$_2$FCl | 54 | 35 | 32 |
| Freon 21 CHFCl$_2$ | 38 | 12 | 25 |

Figure 3:
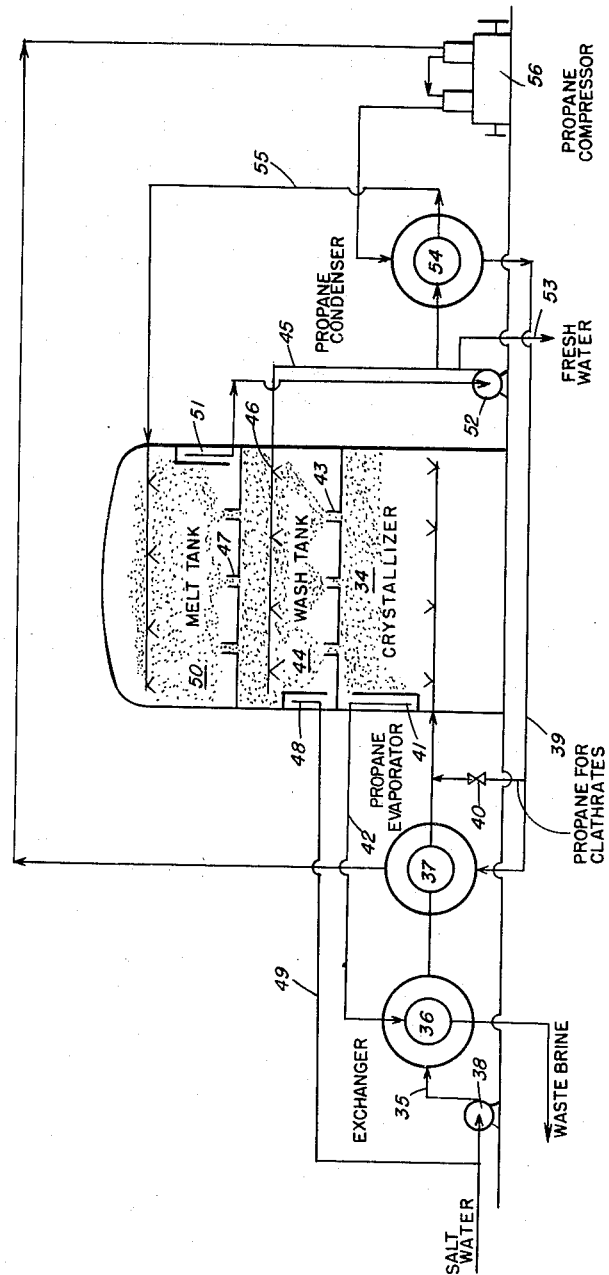
FIGURE 3 shows, in highly diagrammatic form, alternative apparatus for converting continuously in a rising tower salt water to fresh potable water in accordance with this invention.

FIGURE 3 illustrates the design of a large commercial unit suitable for the manufacture of 5,000,000 gallons per day or more of fresh water. Referring now to FIGURE 3, salt water, such as sea water, is fed continuously to the crystal forming tower 34 through conduit 35, heat exchanger 36 and propane evaporator 37, by means of pump 38. Liquid propane is fed to the crystal forming section 34 through the conduit 39 and valve 40. Concentrated brine is removed from section 34 through downcomer 41 and conduit 42. This cold brine is exchanged with the incoming sea water to cool it, in exchanger 36. The crystals formed in section 34, and occluded brine, are removed through riser 43 and enter washing chamber 44. Fresh water enters this section through conduit 45 and distributors 46. The washed crystals leave this section through risers 47 while the wash water, now salty, leaves through downcomer 48 and is recycled through conduit 49 to the suction side of pump 38.

The crystals rising through risers 47 enter the melt section 50 along with entrained wash water. The melted crystals, now water, are removed through riser 51 through pump 52. A portion is removed as fresh product water, via conduit 53; a portion is recycled to the wash tank by conduit 45; the balance is heated in exchanger 54 and returned to the melt tank 47 through the conduit 55.

Propane gas is compressed in compressor 56 and the compressed vapors flow by a conduit to exchanger 54, where they liquefy. The liquid propane flows through conduit 39 and valve 40 where a portion is vaporized to form the clathrate crystals upon contact with the salt water in conduit 35. The balance of the liquid propane vaporizes in evaporator 37 chilling the incoming salt water to temperatures in the range of 30–40° F. Vaporized propane is recompressed in compressor 56.

The invention has been illustrated above to provide an understanding thereof. The illustration of the invention is not intended to limit the scope of the invention. The only limitations intended are found in the attached claims.

I claim:

1. A method for converting saline water to potable water which comprises mixing saline water with a gaseous clathrate former under temperature conditions sufficient to form clathrate crystals of a size in the range of .05″–0.4″ diameters, passing the crystals upwardly through a washing zone as a relatively compact mass countercurrent to downwardly flowing washing liquid, controlling the pressure and the temperature in the washing zone to prevent solidification of the washing liquid and substantial melting of the clathrate crystals, removing the washed crystals from the washing zone to a melt zone, heating the removed crystals in said melt zone to produce and separate therein a gaseous clathrate former and potable water and separately recovering gaseous clathrate former and potable water from said melt zone.

2. A process for preparing potable water which comprises mixing saline water and a gaseous clathrate former under temperature conditions to form clathrate crystals of a size in the range of .05″–0.4″ diameters, moving the formed crystals upwardly into and through a crystal washing zone as a rising relatively compact mass of crystals countercurrent to a washing liquid introduced to the upper end thereof, causing the washing liquid to move downwardly through said mass of upwardly moving crystals at a rate to maintain the crystals moving consistently and substantially uniformly upwardly as a compact mass through the washing zone, withdrawing washing liquid from the lower section of the washing zone, withdrawing washed clathrate crystals from the upper section of said washing zone into a separation zone, heating the clathrate crystals in said separation zone under conditions to form potable liquid water and gaseous clathrate former, and separately withdrawing potable water and gaseous clathrate former from said separation zone.

3. A method for preparing and recovering purified water from saline water which comprises mixing saline water with a gaseous clathrate forming material under temperature conditions sufficient to form clathrate crystals, passing the thus formed clathrate crystals upwardly through the crystal forming zone, a brine recovery zone, a crystal washing zone into a crystal decomposing zone, moving purified water introduced to said washing zone countercurrent to crystals passing therethrough, removing purified water from said crystal decomposing zone, recycling a portion of said removed purified water to said washing zone, removing gaseous clathrate forming material from said decomposing zone, compressing said gaseous material, cooling the compressed gaseous material in said decomposing zone and thereafter passing the cooled gaseous material in direct and indirect contact with the saline water in said crystal forming zone.

4. A process for preparing and recovering purified water from water containing salt which comprises spraying a gaseous clathrate former into a body of water containing salt under conditions to produce clathrate crystals in a crystal forming zone, moving the formed clathrate crystals upwardly through sequentially communicating zones comprising a crystal washing zone and a crystal melt zone, passing purified water from the melt zone to the washing zone, passing wash water to the crystal forming zone, recovering purified water from the melt zone as a product of the process, recovering gaseous material from the melt zone, compressing the recovered gaseous material and passing compressed gaseous material sequentially through the melt zone and the crystal forming zone in indirect heat exchange therewith.

5. A method for reducing the salt content of saline water which comprises causing clathrate crystals formed in a clathrate crystal forming zone to move as a relatively compact mass of crystals sequentially upwardly through separate but interconnected zones, comprising at least a crystal washing zone and a crystal decomposing zone, separating purified water from gaseous material in said decomposing zone, passing purified water obtained in said decomposing zone downwardly through said washing zone countercurrent to rising clathrate crystals as a relatively dense mass of crystals, passing wash water from the lower portion of the washing zone saline feed water to said clathrate crystal forming zone and maintaining temperature conditions in said zones by direct and indirect contact with gaseous material separated in said decomposing zone.

6. The method of claim 5 wherein the gaseous material separated in the decomposing zone is compressed and cooled to a liquid state by indirect heating exchange with the liquid crystal phase in the decomposing zone and the thus cooled gaseous material is thereafter passed in direct and indirect heat exchange with the saline water introduced to the crystal forming zone.

7. The method of claim 5 wherein the interconnected zones are superimposed and connected by a plurality of elongated passageways which restrict the rate of rising of the formed clathrate crystals as a relatively compact mass of crystal into the decomposing zone.

8. The method of claim 5 wherein the gaseous material is selected from the group consisting of methyl bromide, Freon 31, Freon 21 and propane.

9. The method of claim 5 wherein the temperature of the washing zone is maintained intermediate the decomposing temperature of the clathrate crystals and the freezing point of the purified water introduced thereto.

10. A method for purifying saline water which comprises introducing saline water into the lower portion of an elongated confined zone separated into a plurality of superimposed sections communicating with one another through a plurality of separate elongated passageways, introducing gaseous material into the saline water in the lower-most section under conditions to form clathrate crystals, passing the thus formed clathrate crystals as a mass of crystals with concentrated brine upwardly into a concentrated brine removal section, separating and removing concentrated brine therefrom, passing clathrate crystals as a relatively compact mass of crystals upwardly through a plurality of restricted passageways from said brine removal section into a washing section, passing the clatharate crystals through said washing section countercurrent to purified water introduced to the upper portion thereof, removing wash water from the lower portion of said wash section for passage to said lower-most section, passing the washed clathrate crystals upwardly through a plurality of restricted passageways into a melt section, decomposing the clathrate crystals in said melt section under conditions to produce and separate purified water from gaseous material recovering purified water as a product of the process and passing a portion thereof to said wash section, recovering and compressing the separated gaseous material and passing compressed gaseous material in indirect heat exchange with the crystals in said melt section and said lower-most section.

11. A method for preparing potable water from saline water which comprises passing formed clathrate crystals from a clathrate crystal forming zone through a brine removal zone, a washing zone and into a melt zone under desired temperature and pressure conditions as a substantial compact mass of crystals at least between zones, countercurrently washing the crystals in the wash zone with potable water obtained from the melt zone, passing the wash water from the lower portion of the wash zone to the crystal forming zone, obtaining and separating potable water from gaseous material from the clathrate crystals in said melt zone, compressing gaseous material separated in said melt zone, cooling the compressed gaseous material by indirect heat exchange with the liquid in said melt zone and thereafter passing cooled gaseous material in direct and indirect contact with saline water in said clathrate crystal forming zone.

References Cited in the file of this patent

UNITED STATES PATENTS

| | | |
|---|---|---|
| 2,904,511 | Donath | Sept. 15, 1959 |
| 2,974,102 | Williams | Mar. 7, 1961 |
| 3,027,320 | Buchanan | Mar. 27, 1962 |